United States Patent [19]

Kitaura

[11] 4,256,391
[45] Mar. 17, 1981

[54] FLASH RESPONSIVE EXPOSURE TIME CONTROL SYSTEM

[75] Inventor: Mashio Kitaura, Tondabayashi, Japan

[73] Assignee: Minolta Camera Kabushiki Kaisha, Osaka, Japan

[21] Appl. No.: 69,854

[22] Filed: Aug. 27, 1979

[30] Foreign Application Priority Data

Aug. 30, 1978 [JP] Japan .................. 53-106570

[51] Int. Cl.³ .............................................. G03B 7/16
[52] U.S. Cl. ...................................................... 354/33
[58] Field of Search .................. 354/32, 33, 34, 35, 354/38

[56] References Cited

U.S. PATENT DOCUMENTS

| | | | |
|---|---|---|---|
| 3,568,582 | 3/1971 | Uchida et al. ................... | 354/34 |
| 3,756,132 | 9/1973 | Ogawa ............................ | 354/32 |
| 3,779,141 | 12/1973 | Veda et al. ..................... | 354/33 |
| 3,809,954 | 5/1974 | Engelstatter .................... | 354/33 X |
| 4,140,379 | 2/1979 | Von Fischern ................... | 354/32 X |

Primary Examiner—Donald A. Griffin
Attorney, Agent, or Firm—Watson, Cole, Grindle & Watson

[57] ABSTRACT

An exposure time control system includes a circuit which denergizes a shutter control circuit and an electromagnet and causes a shutter closure when an electronic flash device is triggered to fire an electronic flash tube. The system further includes a power supply circuit and a self-maintaining circuit for maintaining the power supply circuit at its active condition after it is activated even after a power switch therefor is opened. A signal generated upon the trigger of the flash device releases the self-maintenance of the power supply.

18 Claims, 2 Drawing Figures

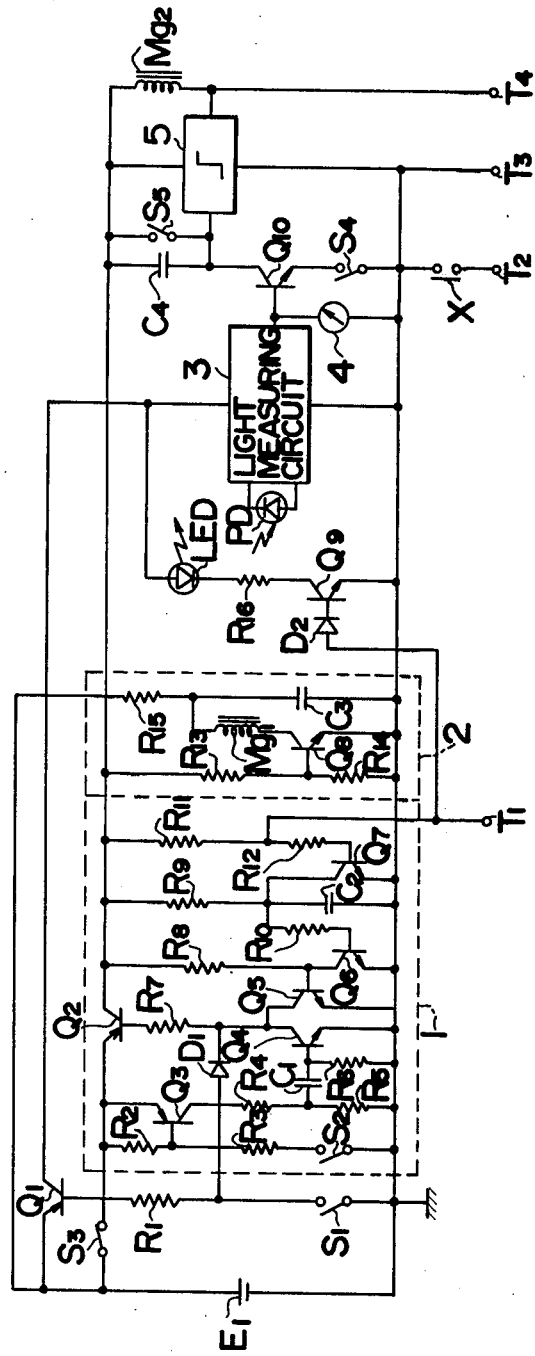
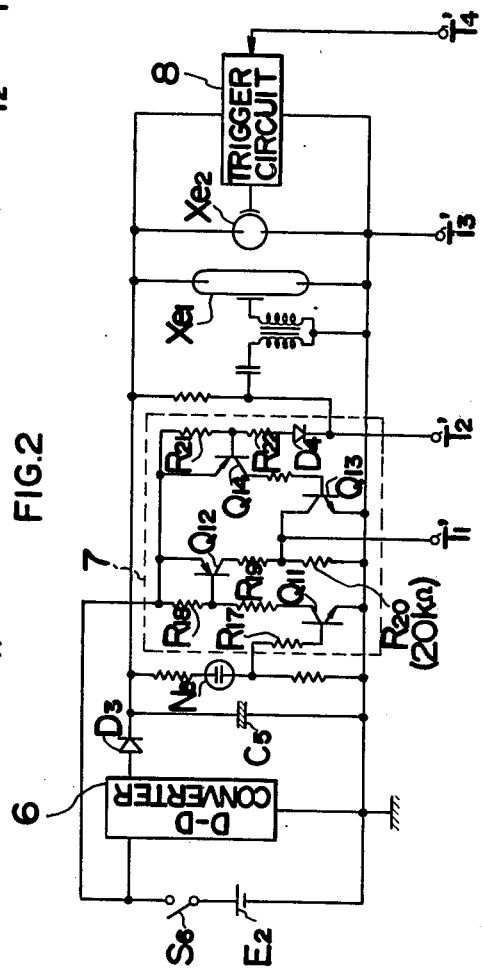

FLASH RESPONSIVE EXPOSURE TIME CONTROL SYSTEM

BACKGROUND OF THE INVENTION

1. Field of the Invention

The present invention relates to an exposure time control system and more particularly it pertains to a system for controlling shutter closure in relation with an operation of an electronic flash device upon flash photography.

2. Description of the Prior Art

A camera exposure control system has been proposed which includes a semiconductor switch member for maintaining a shutter control electromagnet at an active condition for arresting a shutter closing member and preventing shutter closure while a main capacitor of an electronic flash device is charged above a given level, said semiconductor switch member allowing shutter closure when the main capacitor is discharged to fire a flash tube, with its charged voltage rapidly dropping. With this system, the shutter is closed immediately after a flash firing.

In this system, however, an ordinary exposure control circuit for controlling the shutter in accordance with light measurement or manual setting is overridden by the semiconductor element and is made ineffective in the flash controlled exposure mode. Accordingly, such system can not apply to an exposure control system wherein an output from an exposure control circuit is utilized for both shutter control and flash duration control.

SUMMARY OF THE INVENTION

The primary object of the present invention is to provide an exposure time control system for controlling shutter closure in response to flash firing and which may be associated with a control system of the type controlling both exposure time and flash firing by a common control circuit, as well as other types of control systems, for example, controlling only the exposure time by a control circuit in accordance with a stored light signal.

Another object of the present invention is to provide an exposure control system wherein scene light is measured through a camera objective, and exposure time and duration of flash firing are controlled in accordance with the light measurement, with the shutter being closed immediately after a flash firing upon flash photography.

Still another object of the present invention is to provide an exposure control system for a camera wherein the shutter is controlled when a short delay time has passed from a flash firing upon flash photography.

Yet another object of the present invention is to provide an exposure control system which controls exposure time and duration of flash firing in accordance with an output of a light measuring circuit including a photoelectric element receiving the scene light that has traversed a camera objective and is reflected from a film surface, with the shutter being closed soon after a flash firing upon flash photography.

A further object of the present invention is to provide an exposure control system wherein an exposure control circuit is deenergized in response to flash firing.

According to one aspect of the present invention, an exposure time control system comprises an exposure control circuit including an electromagnet for initiating shutter closure upon deenergization thereof, a power supply control circuit which is made conductive to energize the exposure control circuit in response to a shutter release operation and is set into a self-maintaining condition, with the self-maintaining condition being released in response to a signal which is generated in a flash circuit in conjunction with closure of a flash synchro switch in a camera.

The above and other objects, features and aspects of the present invention will appear more fully hereinafter from a consideration of the following description taken in connection with the accompanying drawings wherein one example is illustrated by way of example.

BRIEF DESCRIPTION OF THE DRAWINGS

FIG. 1 shows a camera exposure control circuit in accordance with one embodiment of the present invention, and FIG. 2 shows an electronic flash control circuit to be coupled with the exposure control circuit of FIG. 1.

DETAILED DESCRIPTION OF THE PREFERRED EMBODIMENT

The circuitry shown in FIG. 1 is applied to a camera provided with a focal-plane shutter including a front or leading curtain with a surface having substantially the same light reflecting power as that of a film surface. The circuitry includes an automatic exposure time control circuit which measures scene light traversing a camera objective and reflected by the surface of the front shutter curtain and or the film surface, and which closes the shutter by deenergizing an electromagnet when integration of the light intensity being measured reaches an amount for providing a suitable exposure. With reference to FIG. 1, block 3 is a light measuring and exposure calculation circuit including a photodiode PD which receives light passing through the objective lens and a given diaphragm aperture and reflected from the surfaces of shutter curtains and/or the film surface being exposed. Block 3 further includes a circuit means for generating a voltage signal proportional to the logarithm of the light received by photodiode PD. At the same time, block 3 carries out a photographic calculation with the voltage signal and a signal representative of a set film sensitivity to generate an exposure time control signal corresponding to an exposure time suitable for the scene brightness measured, aperture of an objective diaphragm and set film sensitivity. An exposure time indicating circuit is labeled 4. Logarithmic expansion transistor Q10 generates a collector current proportional to the antilogarithm of the output voltage from light measuring and calculation circuit 3 when switch S4 is closed in response to a shutter opening operation. The collector current is integrated by capacitor C4 and when the charged voltage of capacitor C4 reaches a predetermined level, the output of switching circuit 5 is inverted to deenergize electromagnet Mg2, whereby the shutter is closed. Logarithmic expansion transistor Q10, capacitor C4, switching circuit 5 and electromagnet Mg2 together constitute a conventional exposure time control circuit.

In the above circuit, power is supplied to light measuring and calculation circuit 3 and the exposure time control circuit when transistor Q1 and transistor Q2 are turned on, respectively. Switch S3 connected between power supply E and the emitter of transistor Q2 is opened upon closure of the shutter and is closed upon completion of the film winding-up and shutter cocking. Description will now be given of a circuit for the power supply. Transistor Q1 functions as a first power switch and is turned on with its base current flowing through resistor R1 when light measuring switch S1 is closed at the first stage of the shutter button depression. Block 1 enclosed by a dotted line is a trigger circuit for turning on transistor Q2 which in turn functions as a second power switch. The trigger circuit includes a self-maintaining circuit for maintaining transistor Q2 turned on and a release circuit for releasing the self-maintaining condition in response to a signal from an electronic flash unit. Transistors Q3 and Q4, resistors R2, R3, R4, R5 and R6, capacitor C1 and release switch S2 together constitute a trigger circuit. When the shutter button (not shown) is depressed to the second stage for shutter release, release switch S2 is closed. With release switch S2 closed, transistor Q3 is turned on, whereby the potential at the node between resistors R4 and R5 rises. This rise of potential is transmitted through capacitor C1 to the base of transistor Q4, which is turned on only for a short period of time. With transistor Q4 turned on, transistor Q2 is turned on with its base current flowing through resistor R7. Transistor Q5 is connected in parallel with transistor Q4, and the base of transistor Q5 is connected through resistor R8 to the collector of transistor Q2. With transistor Q2 once turned on, transistor Q5 is supplied with base current through resistor R8 and is made conductive. Thus, even when transistor Q4 remains off, the base current of transistor Q2 flows through transistor Q5, thereby maintaining power supply to a circuit connected to the collector of transistor Q2. In the above circuit, transistors Q2 and Q5, and resistors R7 and R8 together constitute a power-supply self-maintaining circuit.

A circuit comprising transistors Q6 and Q7, resistors R9, R10, R11 and R12 and capacitor C2 is a self-maintenance release circuit for releasing the above power-supply self-maintaining condition. When terminal T1 tapped from the node between resistors R11 and R12 is short-circuited to ground, transistor Q7 is inverted to be non-conductive and transistor Q6 is made conductive, and as a result, transistor Q5 is turned off, whereby the base current of transistor Q2 is cut off, causing transistor Q2 to be turned off to release the self-maintaining condition.

Block 2 enclosed by a dotted line is an electromagnetic shutter release circuit. Electromagnet Mg1 initiates a shutter release operation. When transistor Q8 is turned on, electromagnet Mg1 is energized and operates by the discharge current through its coil from capacitor C3 which has been pre-charged via resistor R15.

Light emitting diode LED, resistor R16 and transistor Q9 connected in series with each other as a collector load of transistor Q1 constitute a charge completion indicating circuit for indicating that the main capacitor of the electronic flash unit is charged to a voltage above a predetermined level.

Diode D2 is connected between terminal T1 and the base of transistor Q9. Transistor Q9 is arranged on turn on only when a voltage is applied to terminal T1 which is more than double the voltage $V_{EE}$ developing across the base emitter of transistor Q9 when it is conductive. Terminals T1, T2, T3 and T4 are respectively connected to terminals T1', T2', T3' and T4' of an electronic flash device which will be described hereinafter.

FIG. 2 shows a circuit of the electronic flash device, wherein a portion excluding block 7 constitutes a known bypass type automatic flash circuit. Referring to FIG. 2, block 6 is a DC to DC converter, a rectifier diode is labeled D3 and a main capacitor is labeled C5. Neon discharge tube Ne lights up when main capacitor C5 is charged above a predetermined level. A flash discharge tube is labelled Xe1 and a bypass tube Xe2. Trigger circuit 8 for bypass tube Xe2 operates to turn on bypass tube Xe2 when a voltage signal from switching circuit 5 of a camera body through terminal T4, changes from a low to a high level. Block 7 enclosed by a dotted line produces a comparatively high output impedance due to resistor R20, at terminal T1 when main capacitor C5 is not completely charged. In addition, block 7 turns on transistor Q12 to produce a voltage above $2V_{EE}$ at terminal T1 when main capacitor C5 is completely charged, and furthermore, block 7 turns on transistor Q13 to produce low impedance at terminal T1 when synchro contact X is closed. It should be noted that when the function of the charge completion indication for main capacitor C5 of the flash device is not provided on a camera body, circuit elements including transistors Q11 and Q12, resistors R17, R18 and R19 for generating a voltage signal in relation to the charge completion of main capacitor C5 are not required.

The operation of the above circuitry will now be explained, at first for ordinary photography without using the flash device. Assume that a film is loaded and switch S3 remains closed. When the shutter button is slightly pressed in the above condition, switch S1 is closed, causing transistor Q1 to be turned on, whereby power is supplied to light measuring circuit 3. With the shutter button further pressed for the shutter release operation, switch S2 is closed, causing transistor Q2 to be turned on, whereby power is supplied to electromagnetic release circuit 2 and the exposure time control circuit. Thus, electromagnet Mg1 for release operation operates to open the shutter. At the same time, switch S4 is closed and switch S5 is opened, whereby counting of an exposure time commences. Transistor Q2 is turned on and its turn-on condition is self-maintained when an exposure starts even if the shutter button is released to open switches S1 and S2, and transistor Q1 is maintained conductive by its emitter current flowing through diode D1 and transistor Q5. When capacitor C4 is charged to a predetermined level, the output level of switching circuit 5 is inverted to deenergize electromagnet Mg2, whereby the shutter closure is activated. When switch S3 is opened upon closure of the shutter, transistor Q2 is turned off, whereby the power supply to the exposure time control circuit is cut off. If, at this time, the shutter button is released, the power supply to the light measuring calculation circuit 3 is also deenergized since switches S1 and S2 are open.

Now, assume that a camera is loaded with a film and power switch S6 in the flash circuit is turned on, for flash photography. With reference to FIG. 2, when main capacitor C5 of the flash device is not completely charged, transistor Q12 remains off since transistor Q11 is not turned on. Furthermore, when synchro contact X of the camera is not closed, transistor Q13 also remains off. Therefore, output terminal T1' is equal in potential to ground as far as the flash circuit is concerned. When output terminal T1' is connected to input terminal T1 of the camera, resistor R20 is supplied with a current flowing through resistor R11 in the circuit of FIG. 1, causing the potential at output terminal T1' to be higher than that of ground by a voltage drop across resistor R20. The amount of a voltage drop caused by resistor R20, at this time, is set at a value, e.g. 0.8 V, which is high enough to turn on transistor Q7 in the circuit of FIG. 1 but insufficient to turn on transistor Q9. With this level thus set, transistor Q8 in the circuit of FIG. 1 is maintained in its off condition, thereby ensuring the above-mentioned power-supply self-maintaining operation.

When transistor Q12 is turned on upon charge completion of main capacitor C5, a voltage high enough to turn on transistor Q9 of the camera is generated from output terminal T1'. Thus, when light measuring switch S1 of the camera is closed, the charge completion in the flash device is indicated by light emitting diode LED in the camera.

When the shutter button is operated and switches S1 and S2 are closed after the charge completion in the flash device, the shutter release is performed for the commencement of exposure, similarly with the case of ordinary photography. When the shutter is fully opened, synchro contact X is closed to cause flash discharge tube Xe1 to be fired and illuminate an object with its flash light. Photodiode PD receives light from the object illuminated with the flash light, and capacitor C4 integrates a current commensurate with the intensity of the received light. When the voltage across capacitor C4 reaches a predetermined level, the output of switching circuit 5 is inverted to a high level, thereby deenergizating electromagnet Mg2, and at the same time, actuating trigger circuit 8 of the flash device, whereby by-pass tube Xe2 is turned on to interrupt light emission from flash discharge tube Xe1. During light emission from the flash device, however, camera exposure operation is continued when the voltage across capacitor C4 has not reach a predetermined switching level. In this case, when synchro contact X is closed, terminal T1 is grounded by turning-on of transistor Q13 in the circuit of the flash device, whereby transistor Q7 in the circuit of the camera is turned off to release the self-maining condition, thus deenergizing electromagnet Mg2 and closing the shutter, and as a result, exposure operation is interrupted. In response to the closure of synchro contact X, transistor Q7 is turned off at once. Due to capacitor C2, however, transistor Q6 is turned on after some delay when transistor Q7 is inverted. Thus, the power-supply self-maintaining condition is released after a slightly delayed time from the closure of synchro contact X, during which power is supplied to light measuring and calculation circuit 3 and the exposure time control circuit for normal light monitoring operation. It is to be understood that if synchro contact X is constructed so as to be closed only when the shutter is fully opened, in the exposure control device according to the present invention as shown in FIG. 1, the flash tube is not fired and exposure is conducted only by natural light when the shutter speed to be determined depending on scene brightness under natural light illumination is higher than a flash synchronizable critical value. In addition, when the shutter speed is equal to or slower than the critical value, the light quantity from the flash device is controlled with the actual shutter speed being controlled to the critical value.

The above explanation is made for an exposure control system wherein exposure time and/or flash duration is controlled in accordance with an output of a light measuring device which measures light coming from an object to be photographed, passing through a camera objective and a diaphragm aperture and reflected from a focal plane shutter surface and/or a film surface exposed to the object light. However it should be noted that the present invention is applicable not only to such mentioned type exposure control but also other types, for example, having an exposure control wherein a light measuring device measures an object light through a camera objective and the output of the device is stored in a storage capacitor so that exposure time and/or diaphragm aperture is controlled in accordance with the stored output. In this case, the electronic flash device coupled or associated with the exposure control is provided with a monitoring device for monitoring the light emitted from the flash device and reflected from an object to be photographed if the flash light is desired to be automatically controlled in accordance with a light measurement.

While the described embodiment represents the preferred form of the present invention, it is to be understood that modifications will occur to those skilled in the art without departing from the spirit of the invention. The scope of the invention is therefore to be determined solely by the appended claims.

I claim:

1. In a combination of a camera and an electronic flash device, an exposure time control system comprising:
   a shutter control circuit including an electromagnetic means for initiating a shutter closure upon deenergization thereof;
   a power supply means actuatable in response to a manual operation for energizing said shutter control circuit and said electromagnetic means;
   a self-maintaining means for maintaining the actuated condition of said power supply means subsequent to the cessation of said manual operation, said self-maintaining means being made operative in response to the actuation of said power supply means;
   a synchro switch for triggering a flash firing in conjunction with a camera shutter operation;
   means for generating a control signal in response to the operation of said synchro switch; and
   means for releasing the self-maintenance of said actuated condition of said power supply means in response to said control signal such that the shutter is closed in response to flash triggering by deenergization of said electromagnetic device.

2. An exposure time control system as in claim 1 further comprising a delay means for delaying the release of the self-maintenance from the generation of said control signal.

3. An exposure time control system as in claim 1 wherein said shutter control circuit includes a photocell receiving an object light passing through a camera objective and reflected from a film surface, an integrating means for integrating a current comensurate with the light received by said photocell, and a switching circuit for generating a second control signal in accordance with the output of said integrating means, said switching circuit being connected to said electromagnetic means and said electronic flash means for controlling the exposure time and the duration of the firing of said flash device.

4. An exposure time control system as in claim 1 wherein said synchro switch is arranged to be closed when the shutter is fully opened.

5. An exposure time control system as in claim 1 further comprising a focal plane shutter including a first shutter curtain movable for uncovering a film to initiate an exposure and a second shutter curtain movable for terminating the exposure, and wherein said synchro switch is arranged to be actuated only when said first shutter curtain fully uncovers the film before said second shutter curtain starts to move.

6. An exposure time control system as in claim 5 wherein said first shutter curtain has its front surface having substantially the same light reflecting power as that of the film, and said shutter control circuit includes a photocell receiving a light reflected from said film surface and/or first shutter curtain front surface and means for controlling said electromagnetic means in accordance with the light received by said photocell.

7. An exposure time control system as in claim 1 wherein said power supply means includes a switch member actuatable in response to said manual operation, a power source, and a semiconductive member having first and second terminals connected between said power source and said shutter control circuit, and a third terminal coupled with said switch member to control the conduction between said first and second terminals in response to the actuation of said switch member; said self-maintaining means includes a second semiconductive member connected in parallel with said switch member to maintain conduction between said first and second terminals of said first semiconductive member while said second semiconductive member is being actuated; said second semiconductive member having a control terminal coupled with second terminal of said first semiconductive member to actuate said second semiconductive member in response to the conduction between said first and second terminals of said first semiconductive member; and said means for releasing is coupled with said control terminal of said second semiconductive member to deactuate the latter in response to flash triggering.

8. An exposure time control system as in claim 7 wherein said means for releasing includes signal means for generating a first signal when the main capacitor of said electronic flash device is being charged and has a voltage lower than a predetermined value, a second signal when the main capacitor has been charged to said predetermined value, and a third signal when the flash firing is triggered, and further comprising a third semiconductive member operative with said signal means for allowing said second semiconductive member to be active when said first or second signal is generated, and deactuating said second semiconductive member when the third signal is generated.

9. An exposure time control device as in claim 8 further comprising an indicating means responsive to said first signal.

10. An exposure time control system as in claim 1 wherein said power supply means includes a switch member closable in response to said manual operation, a power source, and a first semiconductor member having a first terminal connected with said power source, a second terminal, and a third terminal coupled with said switch member for controlling conduction between said first and second terminals in response to the closure of said switch member so that power is supplied from said power source to said shutter control circuit; and said self-maintaining means includes a second semiconductor member having a pair of output terminals connected across said switch member and an input terminal coupled with said second terminal of said first semiconductor member to control conduction between said pair of terminals in response to the conduction between said first and second terminals and maintain the latter conduction, said means for releasing being coupled with said input terminal to disconnect said pair of output terminals.

11. An exposure control system as in claim 10 wherein said shutter control means includes a timing means for timing the shutter closure, and said power supply means includes means for disconnecting said power source from said shutter control circuit in response to shutter closure.

12. An exposure control system as in claim 11 wherein said means for disconnecting includes a mechanical switch connected between said power source and said shutter control circuit and arranged to open in response to the shutter closure and close in response to the completion of a wind-up operation.

13. An exposure control system as in claim 12 wherein said mechanical switch and said first semiconductor member are connected in series with each other.

14. In a combination of a camera and an electronic flash device, an exposure control system comprising:
a shutter control circuit including light measuring means for generating a light representative signal, electromagnetic means for closing the shutter by the deenergization of an electromagnet, and a timer circuit for timing the deenergization of said electromagnet in accordance with said light representative signal;
a power supply means including a power source, a first switch means arranged between said power source and said shutter control circuit, means for making said first switch means conductive in response to a shutter release operation;
a self-maintaining means responsive to the conduction of said first switch means for maintaining the conduction of said first switch means;
a synchro switch for triggering flash firing in conjunction with a shutter operation; and
means for deactuating said self-maintaining means in response to the operation of said synchro switch, whereby the electromagnet is deenergized by the interruption of the power supply irrespective of the operation of said timer circuit.

15. An exposure control system as in claim 14 further comprising, a delay means for delaying the deactuation of said self-maintaining means by the operation of said synchro switch to ensure power supply to said shutter control circuit during flash firing.

16. An exposure control system as in claim 15 wherein said first switch means includes a semiconductor member having a control terminal for actuation thereof, said means for making said first switch means conductive includes a second switch means coupled with said control terminal and arranged to be conductive in response to a shutter release operation to actuate said semiconductor member, and said self-maintaining means includes a third switch means shunting said second switch means and arranged to be conductive in response to the conduction of said first switch means.

17. An exposure control system as in claim 16 wherein said means for deactuating includes a fourth switch means for making said third switch means nonconductive in response to the flash triggering operation.

18. An exposure control system as in claim 17 further comprising a fifth switch connected in series with said first switch means and arranged to open in response to a shutter closure.

* * * * *